R. HOFFHEINS.
4 Sheets—Sheet 1.
Harvester.
No. 2,490.
Reissued Feb. 19, 1867.
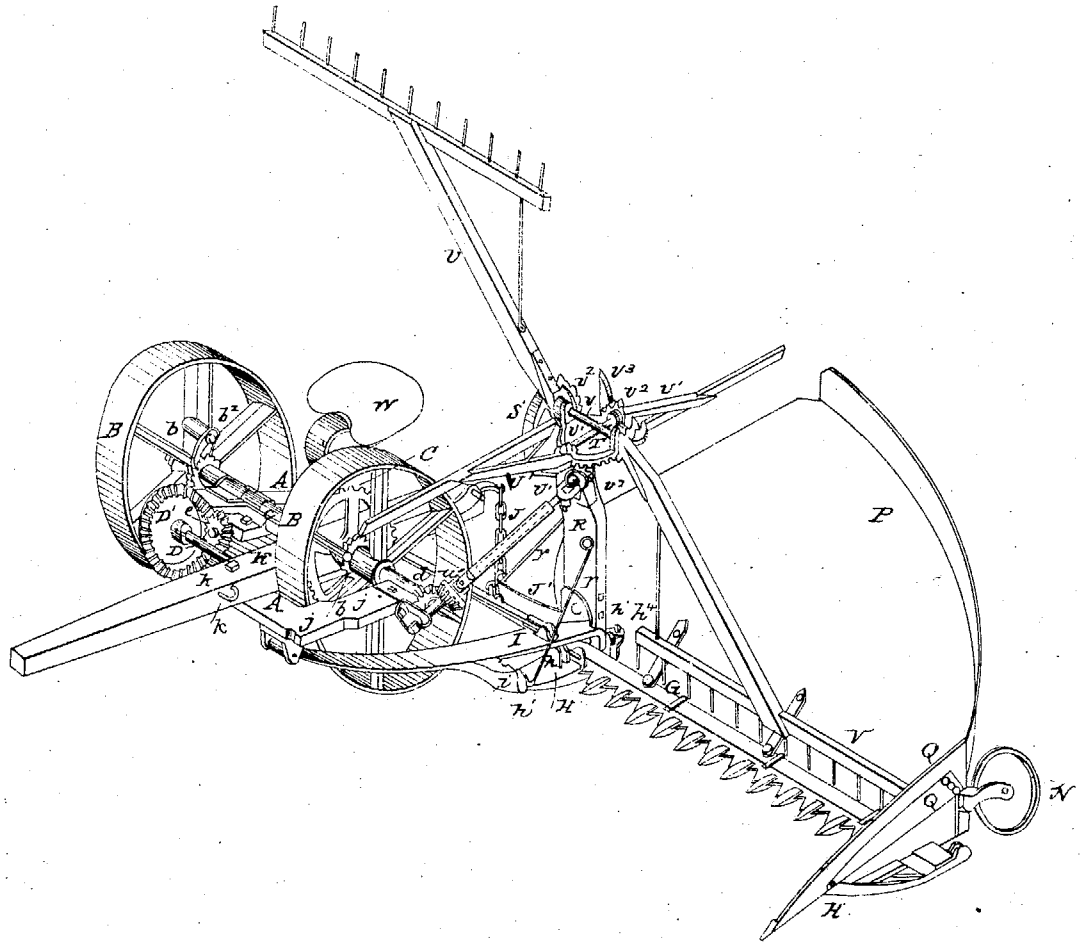
Witnesses
Charles Smith
T. Scheithn
Inventor
R. Hoffheins
By Munn & Co. Attys R. HOFFHEINS.
4 Sheets—Sheet 2.
Harvester.
No. 2,490.
Reissued Feb. 19, 1867.
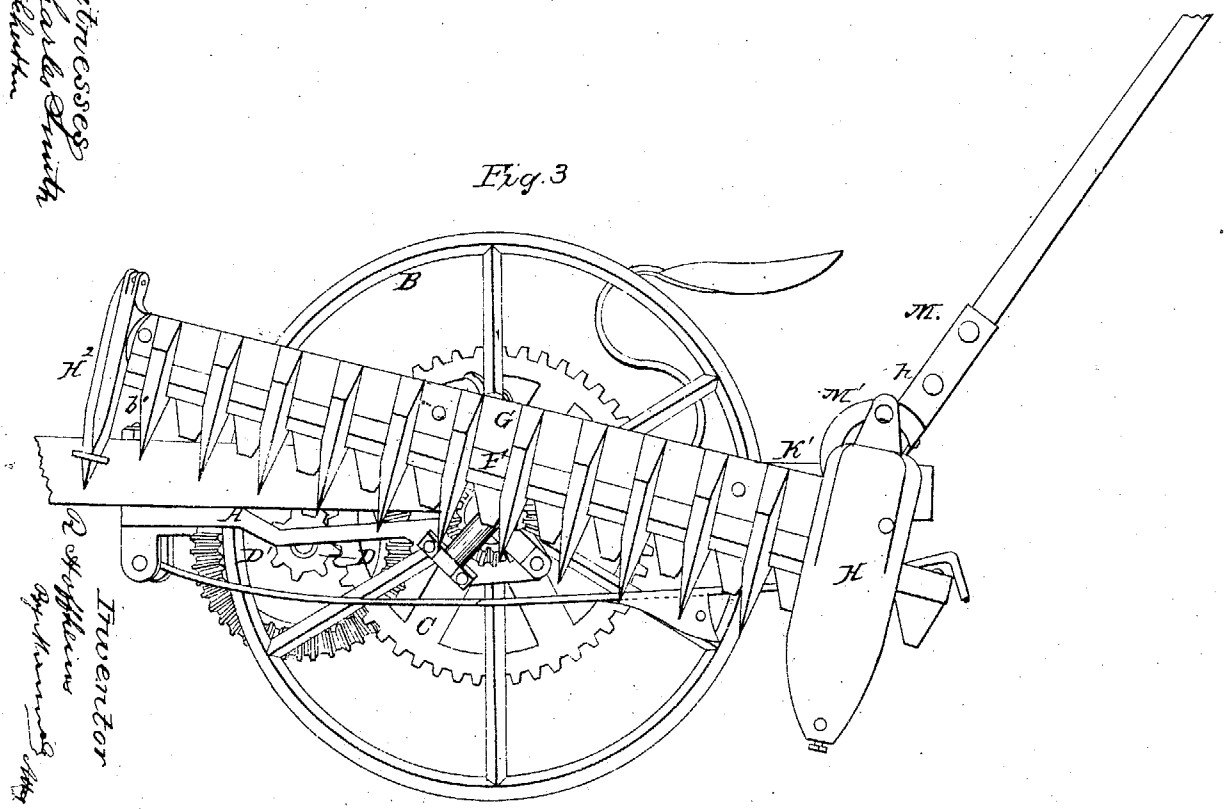

R. HOFFHEINS.
4 Sheets—Sheet 3.
Harvester.
No. 2,490.
Reissued Feb. 19, 1867.
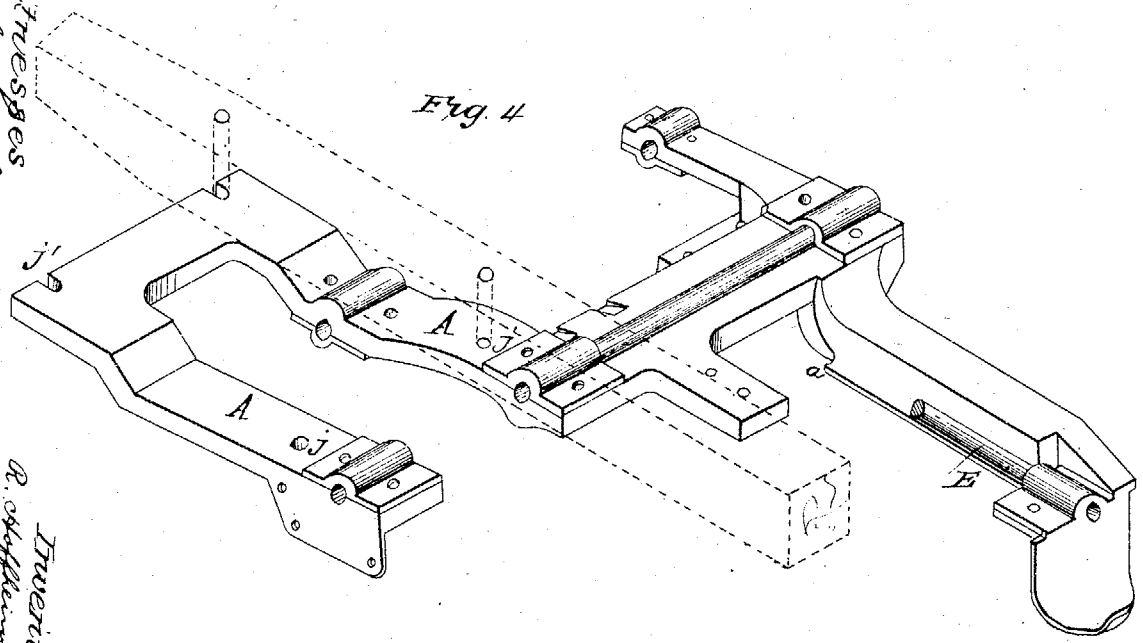
Witnesses
Charles Smith
J Schitter
Inventor
R. Hoffheins
By Munn & Co
Attys R. HOFFHEINS.
4 Sheets—Sheet 4.
Harvester.
No. 2,490.
Reissued Feb. 19, 1867.
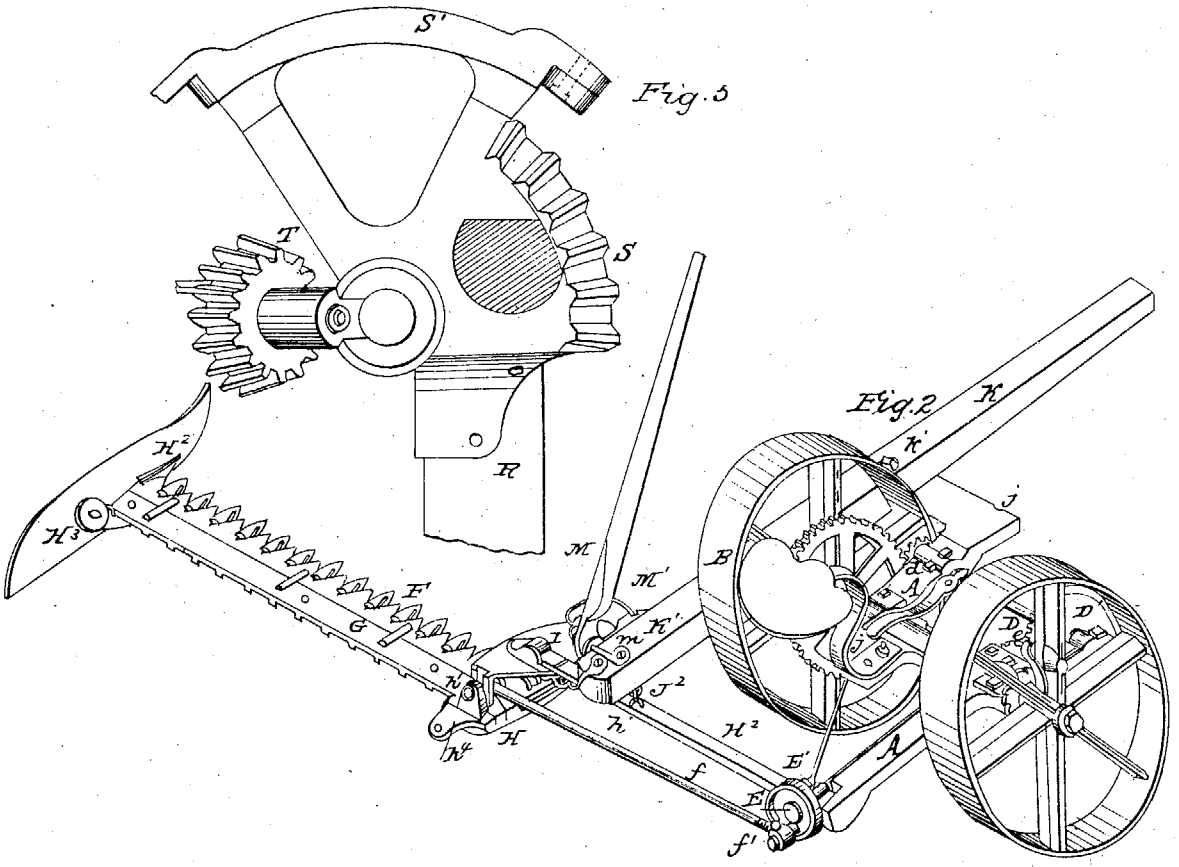
Witnesses
Charles Smith
J. Sheithn
Inventor
R. Hoffheins
By Munn & Co
Attys

UNITED STATES PATENT OFFICE.

REUBEN HOFFHEINS, OF DOVER, PENNSYLVANIA.

IMPROVEMENT IN HARVESTERS.

Specification forming part of Letters Patent No. 40,481, dated November 3, 1863; reissue No. 2,102, dated November 7, 1865; reissue No. 2,490, dated February 19, 1867.

*To all whom it may concern:*

Be it known that I, REUBEN HOFFHEINS, of Dover, in the county of York and State of Pennsylvania, have invented a new and useful Improvement in Combined Harvester and Rake; and I do hereby declare the following is a full, clear, and exact description of the same, reference being had to the accompanying drawings forming part of this specification, and in which—

Figure 1 is a front perspective view of my improved machine as arranged for cutting grain. Fig. 2 is a rear perspective view of the same in the form of a mower. Fig. 3 is a side view of the same as arranged for transportation. Fig. 4 is a perspective view of the main frame detached. Fig. 5 is a plan of the top of the post on which the rake is mounted.

Similar letters of reference in the several figures indicate corresponding parts.

The invention embraced under this patent relates to the mode of combining a raking apparatus with a harvester.

My first improvement consists in the combination, in a two-wheeled hinged-joint machine, of a driver's seat mounted upon the main frame, with a raking mechanism mounted upon the finger-beam, and rotating on a vertical axis, or one nearly so, substantially as hereinafter described, for the purpose of enabling the driver to ride upon the machine while the rake is in operation.

My second improvement consists in the combination, in a two-wheeled machine, of a shoe, with a finger-beam jointed in it, a rake-standard, and platform, with an extension, $J^1$, and a draft or main frame, which sustains the weight of the cutting apparatus and raking apparatus, with platform attached, at a point between the two drive-wheels.

My third improvement consists in the combination of the jointed finger-beam, inner shoe, and raking apparatus, as hereinafter explained.

My fourth improvement consists in the combination of the revolving or turning rake, extensible tumbling-shaft, and driving-shaft of the draft-frame, in the manner hereinafter explained.

To enable others skilled in the art to make and use my invention, I will proceed to describe the construction and operation of the same; but in doing so I wish it to be distinctly understood that I do not confine myself to the construction of the draft-frame, nor to any particular construction of the raking apparatus, but desire to include any style of double-wheeled hinged-joint machine, and any style of revolving rake, in combination with a seat upon the main frame, so long as the principle of operation is substantially the same as hereinafter set forth.

The main frame A A (represented in Fig. 4), is cast in one piece, in the form represented, the ends being left disconnected to facilitate molding and to reduce the weight. B $B^1$ are two driving or supporting wheels, adapted to turn on the axle C, but each, if desired, furnished with a pawl, *b*, taking into a ratchet, $b^1$, on the axle, so as to impart rotation thereto when the wheel is turning forward. $b^2$ is a spring, bearing against the square wheel of the pawl *b*, to hold it either in or out of gear, whichever position it may be set. $C^1$ is the main gear-wheel on the axle C, which gears with a pinion, *d*, on the transverse shaft D, which carries at its other end a bevel cog-wheel, $D^1$, gearing with a bevel-pinion, *e*, on the crank-shaft E. $E^1$ is the crank-wheel, mounted on the rear end of the shaft E, and imparting motion to the cutter F by means of a pitman, *f*, which is provided with a swivel, $f^1$, formed of a screw thread and nut, to permit the rolling of the finger-beam without straining or binding the cutter. *a* represents a flange cast upon the main frame for the purpose of imparting additional strength thereto, and also protecting the crank-shaft E. G is the finger-beam, attached at its respective ends to the inner shoe H and the outer shoe or divider $H^1$. The inner shoe H is pivoted by its center at *h* to the drag-bar I by a universal joint, and at its respective ends to guides *h* $h^1$, which work in vertical dovetail slots formed in pendants *i i* on the drag-bar, in such manner as to brace the beam horizontally, while permitting it to turn freely on its axis, either for the purpose of conforming to the undulations of the ground, to rise over obstructions, or to be turned up edgewise and carried on the machine, in manner as represented in Fig. 3, the point of the divider $H^1$ resting in a staple in the side of the tongue K.

The tongue is attached to the main frame by means of two bolts, $k^1$, passing through it, and through notches or holes $j\,j$ or $j^1\,j^1$ at one side of, or near the center of, the frame, so as to permit the adjustment of the said tongue to a position between the wheels for cutting grain, as illustrated in Fig. 1, or on the outside of the outer wheel $B^1$, for cutting grass, as illustrated in Fig. 2. In either position an extension, K, from the tongue affords a means for supporting the inner end of the finger-beam. This is effected in the illustration given in Fig. 1 by a chain, J, rising from the extreme end of a rigid arm, $J^1$, which projects inward from the finger-beam or platform, and in the illustration shown in Fig. 2 by a chain, $J^2$, attached at its lower end to a staple, $h$, in the lateral stay-rod $H^2$, and at its upper end to a segment-lever, M, fulcrumed at $m$ on the rear end of the tongue, so that by raising the said lever the heel of the beam may be raised to any required height. A rack, $M^2$, holds the lever M in any position in which it may be placed. $H^3$ represents a track-clearer, pivoted in front to the rear of the divider or outer shoe $H^1$. On the rear of the inner shoe H is formed a lug, $h^4$, for the attachment of the inner corner of the segmental platform P. The said platform is secured to the finger-beam at suitable intervals by straps O and bolts $o^1$. N represents a caster-wheel, secured adjustably to the outer edge of the platform, and employed to carry the same at any desired height. Q represents a grain-fender, pivoted in front upon the divider H, and adjustable in height at the rear end by a bolt placed in either of the holes $q$. On the inner side of the grain-platform, near the heel of the finger-beam, is firmly mounted a post, R, which may incline over toward the main frame, as shown in Fig. 1. The said post is braced by stay-rods $r\,r\,r$, the respective lower ends of which may be bolted to the platform, the front of the shoe H, and the outer end of the rigid arm $J^1$, so as to secure the post in rigid connection with the platform, and cause it to follow all the motions of the latter. The post R is provided at its upper end with a cogged segment, S, and a segmental guideway, $S^1$, (see Fig. 5,) by which the revolving rakes are turned and held in the required positions, as will be presently explained. T is an inverted crown-wheel, provided with a vertical shaft, which is journaled in a box on the upper part of the post R. Rotation is communicated to the crown-wheel T by an extensible tumbling-shaft, U U, of square form, made in two parts, sliding one within the other, so as to assume any length which the positions of the parts may require, and work equally well in any position. The said extensible tumbling-shaft is connected at its respective ends by universal joints to pinions $u^1\,u^2$, the first, $u^1$, mounted upon the main frame, and gearing with a pinion, $u^3$, on the axle C, and the second, $u^2$, mounted on the post R, and gearing with the crown-wheel T. The rake or reel arms V $V^1$ are mounted in pairs upon the ends of horizontal shafts $v\,v^1$, journaled at right angles across the top or back of the inverted crown-wheel T. The rake-arms form an angle with the shaft $v$, the inclinations of one arm of each pair being just in a converse direction of the other, so that when one rake or reel arm is over and down close to the platform the other will be at a very high position on the inner side of the machine. By this means the rake and reel arms will stand high enough above the draft-frame, on the inner side of the machine, to move clear of the driver, who sits upon the machine in a seat, W, which is mounted upon the main frame, as shown, or in any other position on the frame that will give the greatest convenience and advantage from his weight and use of his hands in the management of the machine. At the junction of each of the rake or reel arms with the shafts $v\,v^1$ is secured a cog-segment, $v^2$, adapted to gear with the fixed cogged segment S, and in passing over the same to turn the reel or rake on that side of its inverted and elevated position, in which position it is held during about one-fourth of its revolution by a rigid arm, $v^3$, resting on the segmental guideway $S^1$; and it will be apparent that the corresponding reel or rake arm, being rigidly secured to the opposite end of the same shaft, will be held in its lower or working position during the same period.

From the foregoing description it will be seen that my invention enables me to combine in a self-raking harvester all the advantages derived from the two-wheeled hinged-joint machine, and still use a rake that turns about an axis, or revolves entirely around the same, and at the same time have the driver or manager ride upon the main or draft frame in such a position that his weight may aid in counterbalancing the weight of the rake and platform, and his hands may be conveniently employed for controlling the machine. The use of the rigid arm $J^1$, projecting from the finger-beam or platform, and supporting the finger-beam, platform, and rake from the rear of the tongue at a point between the drive-wheels, diminishes the abruptness of the motions of the cutting apparatus, platform, and rake without restricting their freedom in conforming to undulations of the ground. This is the result while cutting grain with the machine, as shown in Fig. 1. The peculiar devices for transmitting motion to the rake adapt it to act equally well at any height or angle of the platform. The peculiar construction and attachment of the inner shoe adapt the finger-beam to roll freely on its axis in use, or to be turned over on its edge, and folded compactly against the frame, as illustrated in Fig. 3, to adapt the machine to be moved from place to place. The pawl or ratchet connection between the driving-wheels and their axle adapts the machine to be turned or backed with perfect freedom, and also affords ready means for throwing the entire machinery out of gear, which is effected by raising the pawls out of the ratchets, where they will be held by the springs $b^2$. I would here remark that any well-known style of two-wheeled draft-frame adapted to the purpose herein set forth may be used.

The operation is as follows: For cutting grain the parts are arranged as shown in Fig. 1. The successive rake and reel arms, descending, (as the machine moves forward,) in front of the finger-beam, deflect the grain backward toward the cutters in the customary manner, and the rakes remove the cut grain in compact gavels from the platform, and deposit it out of the return path of the horses. In mowing, the platform and reel are removed, and the cutter is left perfectly free, being suspended on a chain, by which it is raised and lowered through a lever, as before explained, the tongue being transferred to a position on the outside of the wheel $B^1$, for the purpose of making the machine operate as a mower to better advantage. The cutting apparatus may be thrown out of gear by moving the transverse shaft D longitudinally by lever $D^2$, and providing it with a pin, $d^2$, which, in one position of the shaft, will fit a recess in the hub of the wheel, so as to impart rotation thereto, and in the other position will permit the shaft to turn independently of the wheel. This lever may be moved by the hand or foot of the driver.

Having thus described my invention, what I claim as new under this patent is—

1. The combination, in a two-wheeled hinged-joint machine, of a driver's seat mounted upon the main frame, with a raking mechanism mounted upon the finger-beam, and rotating around a vertical axis, or one nearly so, substantially in the manner described, for the purpose of enabling the driver to ride on the machine while the rake is in operation.

2. The combination, in a two-wheeled hinged-joint machine, of a shoe, with a hinged joint in it, with a rake and platform, having an extension, $J^2$, and with a draft-frame, which sustains the weight of the cutting apparatus and raking apparatus with platform attached at a point between the two drive-wheels.

3. The combination, with the hinged-joint machine, of the inner shoe and raking apparatus, substantially as described.

4. The combination of a revolving or turning rake, extensible tumbling-shaft, and driving-shaft or axle of the main frame, substantially as described.

5. The combination of a two-wheeled hinged-joint machine, a revolving raking apparatus, and a driver's seat mounted on the main frame, substantially as described, and for the purpose set forth.

6. I claim driving a revolving rake, or a combined revolving rake and reel, which move about a vertical, or nearly vertical, axis, by a device arranged on the grain side of the inner drive-wheel or inner side of the draft-frame.

7. Making a direct driving connection between a revolving rake, or a combined rake and reel, which move about a vertical, or nearly vertical, axis, and the inner end of the main-frame axle of the draft-frame.

8. Employing a tumbling-shaft on the inner side of the draft-frame for driving a revolving rake, or a revolving rake and reel, which is mounted on a hinged finger-beam or upon the platform.

9. The combination of a quadrant platform, hinged finger-beam, revolving rake, and a driver's seat supported by the main frame.

R. HOFFHEINS.

Witnesses:
R. T. CAMPBELL,
EDW. SCHAFER.